(12) United States Patent
Steadman Booker et al.

(10) Patent No.: US 10,365,380 B2
(45) Date of Patent: Jul. 30, 2019

(54) PHOTON COUNTING DEVICE AND METHOD

(71) Applicant: KONINKLIJKE PHILIPS N.V., Eindhoven (NL)

(72) Inventors: Roger Steadman Booker, Aachen (DE); Ewald Roessl, Ellerau (DE)

(73) Assignee: KONINKLIJKE PHILIPS N.V., Eindhoven (NL)

(*) Notice: Subject to any disclaimer, the term of this patent is extended or adjusted under 35 U.S.C. 154(b) by 0 days.

(21) Appl. No.: 15/748,750

(22) PCT Filed: Jul. 29, 2016

(86) PCT No.: PCT/EP2016/068131
§ 371 (c)(1),
(2) Date: Jan. 30, 2018

(87) PCT Pub. No.: WO2017/032548
PCT Pub. Date: Mar. 2, 2017

(65) Prior Publication Data
US 2019/0025440 A1      Jan. 24, 2019

(30) Foreign Application Priority Data

Aug. 27, 2015 (EP) .................................. 15182717

(51) Int. Cl.
*G01T 1/00* (2006.01)
*G01T 1/17* (2006.01)
(Continued)

(52) U.S. Cl.
CPC .............. *G01T 1/17* (2013.01); *G01T 1/247* (2013.01); *G01T 1/2928* (2013.01); *H04N 5/3456* (2013.01); *G01J 2001/442* (2013.01)

(58) Field of Classification Search
CPC ......... G01T 1/17; G01T 1/247; G01T 1/2928; H04N 5/3456; G01J 2001/442
See application file for complete search history.

(56) References Cited

U.S. PATENT DOCUMENTS 7,208,739 B1    4/2007 Yanoff
2002/0145115 A1   10/2002 Nygard
(Continued)

FOREIGN PATENT DOCUMENTS

| WO | 2004/064168 | 7/2004 |
|---|---|---|
| WO | 2008/050283 | 5/2008 |
| WO | 2014173812 | 10/2014 |

OTHER PUBLICATIONS

Ballabriga, et al., "The Medipix3 Prototype, a Pixel Readout Chip Working in Single Photon Counting Mode With Improved Spectrometric Performance", IEEE Transactions on Nuclear Science (vol. 54, Issue: 5 ), Oct. 2007.
(Continued)

*Primary Examiner* — Kiho Kim
(74) *Attorney, Agent, or Firm* — Larry Liberchuk

(57) ABSTRACT

The invention relates a photon counting device and method for counting photon interactions in a piece of converter material and addressing the issue of charge sharing. The occurrence of a charge sharing event is already detected upon the onset of the pulse, taking into consideration an onset of a pulse in a neighboring pixel within a preferably very short coincidence window. According to the invention, it is detected whether a pulse is being processed and one or more neighboring pixels are scouted to decide whether a simultaneous interaction has been registered within a very short coincidence window.

15 Claims, 4 Drawing Sheets

(51) Int. Cl.
*G01T 1/29* (2006.01)
*G01T 1/24* (2006.01)
*H04N 5/345* (2011.01)
*G01J 1/44* (2006.01)

(56) References Cited

U.S. PATENT DOCUMENTS

2011/0210235 A1* 9/2011 Dierickx .................. G01T 1/17
 250/214 R
2012/0112088 A1 5/2012 Abraham
2012/0305786 A1* 12/2012 Dierickx .................. G01J 1/44
 250/371
2014/0175299 A1 6/2014 Spahn

OTHER PUBLICATIONS

Walsh, et al., "First CT using Medipix3 and the MARS-CT-3 spectral scanner", 12th International Workshop on Radiation Imaging Detectors, Jul. 11-15, 2010.

* cited by examiner

PHOTON COUNTING DEVICE AND METHOD

CROSS REFERENCE TO RELATED APPLICATIONS

This application is the U.S. National Phase application under 35 U.S.C. § 371 of International Application No. PCT/EP2016/068131, filed Jul. 29, 2016, published as WO 2017/032548 on Mar. 2, 2017, which claims the benefit of European Patent Application No. 15182717.7 filed Aug. 27, 2015. These applications are hereby incorporated by reference herein.

FIELD OF THE INVENTION

The invention relates to a photon counting device for counting photon interactions in a piece of converter material, a photon counting method for counting photon interactions in a piece of converter material and a corresponding software product.

BACKGROUND OF THE INVENTION

Photon counting may be employed in a number of contexts, one of which is medical imaging. For example, energy resolving photon counting detectors are used for spectral computer tomography (CT). Somewhat similar detectors are provided also in other applications, e.g. photon-counting mammography.

One of the challenges in photon counting is the so-called charge sharing. In particular, charge sharing in direct-conversion materials causes a degradation of the spectral performance. A single X-ray interaction in the sensor may cause charge to drift to two or more pixels depending on the location of the charge cloud within the bulk. The charge is therefore distributed over two or more pixels and is conventionally registered as two or more events with corresponding lower equivalent energy. Effectively this means that the expected spectrum is contaminated by false low energy events which no longer contribute to the photo-peak but rather show up as a background signal generally referred to as "low energy tail".

Reducing or completely removing such low energy spurious events has a significant impact on improving the spectral quality of the detector and will result, for example, in improved, i.e. less noisy, material decomposed images in the context of spectral (photon-counting) CT.

An approach on charge sharing compensation led to the Medipix3-CERN ASIC (see, for example, "The Medipix3 Prototype, a Pixel Readout Chip Working in Single Photon Counting Mode With Improved Spectrometric Performance" by Ballabriga, R. et al., IEEE Transactions on Nuclear Science (Volume: 54, Issue: 5), October 2007).

US 2012/0112088 A1 is also related to photon detection and provides for correcting charge sharing in a radiation scanner. A data acquisition component of US 2012/0112088 A1 may be configured to determine whether charge sharing has occurred based upon an identified energy spectrum of one or more pulses, or based upon which thresholds are activated and/or deactivated for a given pulse within a given time frame.

According to the conventional approaches a (in some cases even significant) reduction in count-rate performance may occur.

Detection of a charge sharing based on an energy spectrum or based on the threshold history of the pulse involves complex considerations can only be performed after the complete pulse.

A counting digital x-ray detector for recording x-ray images of an object irradiated by x-ray radiation according to US 2014/0175299 A1 includes a direct x-ray converter for converting x-ray radiation into an electric signal and a matrix with a plurality of counting pixel elements. At least one part of the counting pixel elements has a signal input and two circuits for converting the signal into a count signal. A first circuit of the two circuits is configured to convert the signal entering the respective pixel element directly into a count signal and to count the count signal. A second circuit of the two circuits is configured to convert the signal entering directly into the resective pixel elemnet together with coincident occurring signals of at least one neighboring pixel element into a count signal and to count the count signal. The first circuit and/or the second circuit are able to be activated individually and both together.

WO 2004/064168 A1 provides a photon-counting imaging device for single x-ray counting comprising: a) a layer of photosensitive material; b) an NxM array of photodetector diodes arranged in said layer of said photosensitive material; c) an NxM array of readout unit cells comprising an high gain, low noise amplifying means, one readout unit cell for each photodetector diode; the readout unit cells being controlled by a data processing means; d) each readout unit cell comprising an internal data processing means allowing to assign an output signal representing an amplifiyied signal of the electron hole pairs generated by an incident photon or a predetermined number of incident photons in the respective photodectector diode to a preselectable region of interest: and e) said assignment of the output signal is accompanied by a time stamp generated by a clock means. Due to this measures beside the normal operation of the photon counting imaging device the output signal generated by the anplifying means can be treated separately with respect to the occurrence of the photon hitting the respective photodetector diode. For that reason, the time resolution at least for this preselected region of interest is enhanced as far as the clock means allow this resolution with an appropriate frequency.

SUMMARY OF THE INVENTION

It is an object of the present invention to provide a photon counting device and a photon counting method which allow to account for charge sharing and in which the problems, drawbacks and/or shortcomings of the prior art are avoided or at least reduced or mitigated.

In a first aspect of the present invention, a photon counting device for counting photon interactions in a piece of converter material is presented, comprising a plurality of energy discriminators and a pulse detector, each being arranged to receive a pulse generated by a photon interacting with the piece of converter material, and a plurality of counters, each of the counters being coupled to one of the energy discriminators, for counting photon interactions with energy discrimination according to an energy level of the coupled energy discriminator, wherein the pulse detector is arranged to provide a pulse logic signal upon receiving an input of a predetermined energy level, the predetermined energy level being lower than the energy levels of the energy discriminators, wherein the photon counting device further comprises a prevention circuitry arranged to receive a neighboring logic signal indicating an input of predetermined energy level in at least one neighboring piece of converter material, wherein the prevention circuitry is arranged to selectively prevent a pulse from being counted by any one of the plurality of counters in case the pulse logic signal and the neighboring logic signal are present together in a coincidence window of predetermined size.

In a second aspect of the present invention, a photon counting method for counting photon interactions in a piece of converter material is presented, comprising the steps of receiving a pulse generated by a photon interacting with the piece of converter material, providing a pulse logic signal upon the pulse reaching a predetermined energy level, and preventing, in case a neighboring logic signal indicating an input of predetermined energy level in at least one neighboring piece of converter material and the pulse logic signal are present together in a coincidence window of predetermined size, the pulse from being counted by any one of a plurality of counters, each of the counters being coupled to one of a plurality energy discriminators, for counting photon interactions with energy discrimination according to an energy level of the coupled energy discriminator, each energy discriminators being arranged to receive the pulse.

The inventor realized that an occurrence of a charge sharing event may already be detected upon the onset of the pulse, taking into consideration an onset of a pulse in a neighboring pixel (or piece of converter material) within a preferably very short coincidence window. According to the invention, it is detected whether a pulse is being processed and one or more neighboring pixels are scouted to decide whether a simultaneous interaction has been registered within a very short coincidence window. Such coincidences can either be caused by true coincidences from two unrelated photon interactions or the simultaneous registration of shared charge. Since charge sharing events in adjacent pixels occur basically instantaneously or simultaneously, the coincidence window may be made very small within the limit of practical implementation. In particular, the coincidence window, in particular in the context of CT applications of the present invention, may be less than 10 ns, preferably less than 5 ns, more preferably less than 2 ns, e.g. may be just 1 ns.

The width of the coincidence window is preferably selected such that the probability of rejecting true events is low. Due to the high rates in CT applications, there is a finite probability that two adjacent pixels receive impinging photons near-simultaneously. A too large window would cause the circuit to reject too many events that may not have been caused by charge sharing. If, however, the invention is used in a context where there is a lower rate, the coincidence window may be broader. Furthermore, it is contemplated that the size of the coincidence window may be dynamic in a sense that, for example, depending on the photon flux in a previous time frame for a pixel or group of pixels, the coincidence windows of such pixel or group pixels is adjusted. This means that during a period of high flux for a pixel or group of pixels, the coincidence window may be or become smaller, while during a period of low flux, the coincidence window may be or become broader. A dynamic adjustment of the coincidence window (either generally or separately on a basis per pixel or per group of pixels) is expected to allow for better compromising for the rejection of charge sharing versus the rejection of true coincidences over a larger dynamic range.

In a preferred embodiment, the prevention circuitry is provided with a digital propagation delay network for determining whether the pulse logic signal and the neighboring logic signal are present together in the coincidence window, and/or wherein the pulse logic signal is provided with a monostable characteristic.

It must be noted that there are many different ways to implement the coincidence window. As one example, a monostable output is proposed that may generally be controlled by an RC time constant. For the short pulses required, the coincidence window may also be advantageously implemented by means of a digital propagation delay network.

In a preferred embodiment, the photon counting device comprises an output for providing the pulse logic signal to a photon counting device for counting photon interactions in a neighboring piece of converter material.

Preferably all photon counting devices corresponding to the full range of pixels or pieces of converter material in a given implementation are arranged to exchange information about the detection or the onset of a pulse with one or more neighboring devices, even though this is not strictly necessary.

For example, it is also possible that a photon counting device does not provide the pulse logic signal to a neighboring photon counting device, wherein the prevention circuitry may in such case be arranged to selectively present also a pulse from the neighboring piece of converter material from being counted by the neighboring photon counting device.

In a modification of the above preferred embodiment, the photon counting device comprises a pulse window delay section for delaying the providing of the pulse logic signal by a predetermined period of time.

The pulse window delay section allows the neighboring photon counting device to observe the "past" relative to its own events. This may, however, not be required in implementations as all pixels may be allowed to decide to address events of charge sharing (e.g. reject pulses) on their own.

In a preferred embodiment, the photon counting device comprises a neighbor window delay section for delaying the receiving of the neighboring logic signal by the prevention circuitry by a predetermined period of time.

As a counterpart to the above modification, the delay may also be provided on the receiving side of the prevention circuitry.

In a preferred embodiment, the photon counting device comprises a discriminator delay section for delaying the receiving of the pulse by the plurality of energy discriminators by a predetermined period of time and/or a plurality of counter delay sections, each provided between an output of an energy discriminator and an input of a counter and providing a delay of a predetermined period of time.

The delaying of the pulse (or its processing) before it reaches the counters may be provided to ensure that the decision on addressing a charge sharing event (e.g. to reject or not) is taken before the lowest energy discriminator may be allowed to increase its corresponding counter. Whether or not such delay is to be provided therefore depends on the shaper speed and the position of the lowest threshold with respect to the predetermined energy level of the pulse detector (i.e., after pulse detector becomes active, the lowest threshold should not be reached before closing of the coincidence window, e.g. within the next >1 ns).

In a preferred embodiment, the prevention circuitry is further arranged to stop preventing the pulse from being counted upon receiving an end signal from an energy discriminator and/or the pulse detector, said end signal indicating that the pulse has expired.

The prevention circuitry may, for example, be implemented using a flip-flop that in turn disables the counters from registering events. The flip-flop may be reset by a discriminator returning back to an inactive state. It is possible to use in particular the lowest discriminator for such reset, even though using the lowest threshold is not required. Any discriminator can be used, i.e. any discriminator returning to an inactive state may be a sufficient condition to indicate that the pulse has been processed. Using the lowest discriminator gives the benefit that this indeed indicates that the pulse has (virtually) ended, but includes a possible disadvantage as well. In high flux regimes, pulse-pile up may prevent the lowest discriminator from returning to inactive or may cause only seldom return to inactive.

In a preferred embodiment, the photon counting device comprises a pulse counter arranged to count photon interactions based on the pulse logic signal provided by the pulse detector.

The pulse detector itself may additionally fulfill functions of a further energy discriminator. In other words, an existing design of a photon counting device may be modified towards the present invention without the need for adding a further energy discriminator/pulse detector.

In a preferred embodiment, the photon counting device comprises a coincidence counter arranged to count coincidence events of the pulse logic signal and the neighboring logic signal being present together in the coincidence window.

It is possible to register the number of charge sharing events that have been detected for every given pixel. Such a count value can be attained, for example, by including an additional counter. Here, charge sharing events might be counted in two or more pixels, i.e. each pixel in coincidence will register the event. If required, measures can be taken to register the charge shared event in only one pixel. The pixels involved in the event can also be resolved based on the input to the photon counting device from the neighboring devices.

In an advantageous modification of the above preferred embodiment, the prevention circuitry is arranged to receive separate neighboring logic signals, each of the separate neighboring logic signal indicative of an input of predetermined energy level in a different neighboring piece of converter material, wherein the coincidence counter is arranged to provide separate counts of coincidence events for the different neighboring pieces of converter material.

Here, instead of a single coincidence counter, for example, a total of four coincidence counters may be provided, each indicating not only the number of charge shared events but also with which pixel it was shared. Assume the photon counting device is provided for a centre pixel and there are four neighboring pixels, to the north, to the south, to the west and to the east. For example, these counters may be referred to as C-N (centre-north), when a charge shared event shows coincidence between said pixels, C-S, C-E and C-W respectively. In fact, since coincidence will be flagged in two pixels simultaneously, provided a correspondingly arranged photon counting device is present for each pixel, C-S can be shared by the southern neighbor, i.e. S-C. Practically this means that this particular counter will register one count when a charge event is shared between pixels Centre and South. The same applies to C-E, C-N and C-W respectively.

In a preferred embodiment, the photon counting device comprises an adding section arranged for selectively adding the pulse generated by the photon interacting the piece of converter material and a pulse generated by the photon interacting with the neighboring piece of converter material, and an arbitration control section arranged to control the adding section based on the pulse logic signal and the neighboring logic signal.

A further improvement of the photon detection may be achieved if the charge sharing event is not completely rejected, even if such rejection alone may already have a (very) positive impact on improving spectral performance and modulation transfer function (MTF). The embodiment indicated in the preceding paragraph allows for restoring the original interaction by adding the charge of both (or even multiple) events and assigning it to one of the pixels involved. In other words, the restoration involves adding the charge of two or more pixels and letting it be processed by the thresholds or discriminators of one single pixel (i.e. of one photon counting device).

Even though the charge may be restored in the digital domain (by adding discriminator outputs), provided there is a sufficiently large number of thresholds provided (i.e. the energy discrimination is sufficiently fine), the above embodiment allows for restoring the charge sharing event also in the analogue domain, so there are no limitations as to the energy discrimination being fine and may also be used in case of, for example, three to six thresholds per pixel.

In an advantageous modification of the above preferred embodiment, the photon counting device comprises a pulse output arranged for outputting the received pulse generated by the photon interacting with the piece of converter material to a photon counting device for counting photon interactions in the neighboring piece of converter material.

By providing the pulse, potentially, also to a neighboring photon counting device, a greater flexibility and accuracy as to the assigning to the charge sharing event to a particular pixel may be obtained.

In another advantageous modification of the above preferred embodiment, the photon counting device comprises a switch arranged for preventing the plurality of energy discriminators from receiving the pulse, wherein the arbitration control section is arranged to control such that either the adding section adds the pulse generated by the photon interacting the piece of converter material and the pulse generated by the photon interacting with the neighboring piece of converter material or the switch prevents the plurality of energy discriminators from receiving the pulse.

Here, the assigning of the charges generated by the charge sharing event is provided such that either the pulse received at the photon counting device is forwarded to another photon counting device, while interrupting the connection between the input and the counters at an appropriate place, or the pulse received at the photon counting device is bolstered by adding one or more pulses forwarded from one or more neighboring photon counting devices.

In a further aspect of the present invention a computer program is presented for counting photon interactions, the software product comprising program code means for causing a photon counting device according the first aspect of the invention to carry out the steps of the method according to the second aspect of the invention when the software product is run on the photon counting device.

It shall be understood that the photon counting device of claim 1, the method for photon counting of claim 14, and the computer program of claim 15 have similar and/or identical preferred embodiments, in particular, as defined in the dependent claims.

It shall be understood that a preferred embodiment of the invention can also be any combination of the dependent claims or above embodiments with the respective independent claim.

These and other aspects of the invention will be apparent from and elucidated with reference to the embodiments described hereinafter.

DETAILED DESCRIPTION OF EMBODIMENTS

Figure 1:
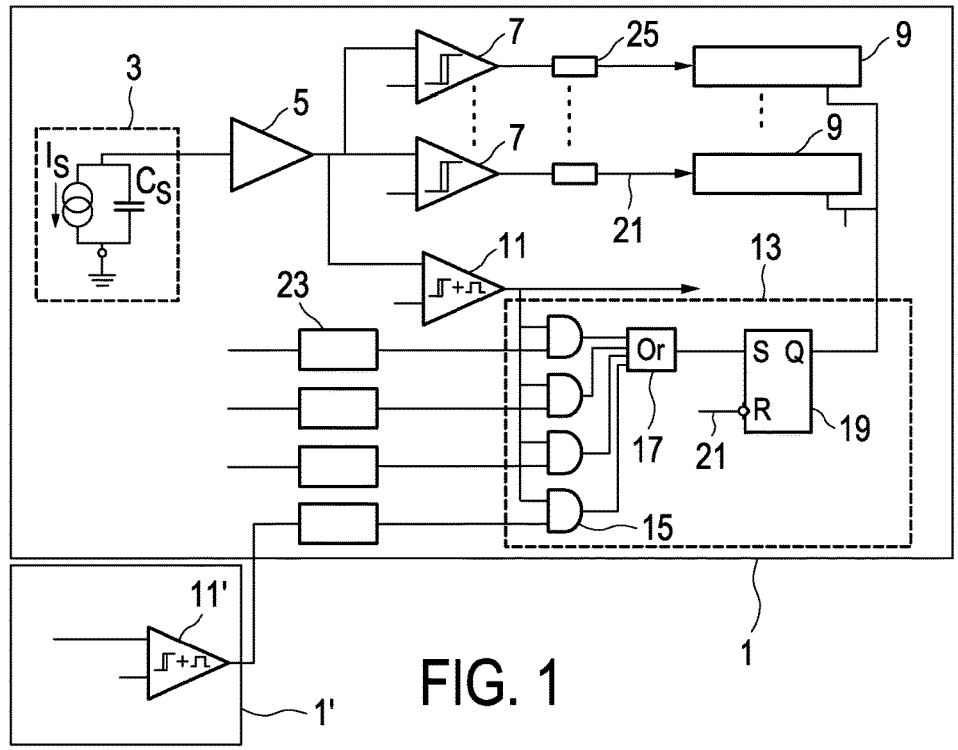
FIG. 1 shows a block diagram illustrating a photon counting device in accordance with an embodiment of the invention.

FIG. 1 shows a block diagram illustrating a photon counting device in accordance with an embodiment of the invention.

The photon counting device 1 in this embodiment includes a direct converter 3, providing its output to a pulse shaper 5, which in turn provides the shaped pulse to a number of energy discriminators 7 (or threshold sections). For each of these threshold sections 7 a corresponding counter 9 is provided.

The basic outline of the photon counting device 1 corresponds to conventional photon counting devices, with which the skilled person is well familiar. Accordingly, no additional explanation to the basic operation of these elements needs to be given.

The term "pixel" is used here, depending on the context, as either referring to the particular piece of converter material or to the combination of such "pixel" with its corresponding photon counting device.

As indicated above, each pixel includes a typical photon counting channel with several energy discriminators. In this embodiment, an additional threshold 11 (pulse threshold, PTH, or pulse detector) is provided with a low energy level (e.g. 5 keV, or sufficiently above the electronic noise).

This additional threshold or pulse detector 11 acts for pulse detection, i.e. detecting that a pulse is being processed. The output of the pulse detector 11 has a monostable characteristic, i.e. upon a pulse being detected the output remains active over a limited time period (e.g. 1 ns).

The output of the pulse detector 11 is logically compared, with a prevention circuitry 13, with the output of corresponding pulse detectors 11' of the adjacent pixels (e.g. north, south, west and east, but not restricted to this). If any (OR 17) of this logical AND functions 15 produces an active output, it serves as indication that coincidence events were registered between Pixel 1 and any neighbor pixel.

In FIG. 1, the neighboring pixel or photon counting device 1' is shown without giving further details, except for indicating the pulse detector 11'. Furthermore, for readability only one of the neighboring photon counting devices 1' is shown, while the photon counting device 1 in this embodiment is arranged to receive pulse detector outputs from four neighboring photon counting devices 1'.

The above mentioned coincidence hit within a very short time interval (e.g. 1 ns) may be resulting from a charge sharing event.

To this end, the embodiment shown in FIG. 1 enables a flip-flop 19 that in turn disables the counters 9 from registering this event. The flip-flop 19 may be reset by the lower threshold returning back to an inactive state 21, even though in practice any threshold return back to an inactive state may be used for such reset. Since all pulse detector outputs across pixels have the same monostable characteristic, the coincidence window corresponds ultimately to the duration of the active state of the monostable output.

In FIG. 1, the pulse detector output of all pixels is fed into the "centre" pixel with a given window delay 23. This delay 23 allows the centre pixel observing the "past" relative to its own events. This may not be required as all pixels may be allowed to decide to reject pulses on their own.

Also, in FIG. 1, the outputs of all discriminators 7 go through a respective propagation delay block 25. This is provided to ensure that the decision to reject or not is taken before the lowest threshold discriminator 7 may be allowed to increase its corresponding counter 9. Any necessity to include such a discriminator delay 25 therefore depends on the shaper speed and the position of the lowest threshold with respect to the energy level of the pulse detector 11 (i.e., after the pulse detector 11 becomes active, the lowest threshold 7 may not be active within the next e.g. >1 ns).

In an alternative embodiment (not shown), such an additional pulse detector is not provided as such, as the lowest threshold/discriminator may be used instead followed by a monostable stage. Put in another way, the pulse detector 11 of the present embodiment may also be coupled to a corresponding counter, such that is also functions as a discriminator similar to discriminators 7.

FIG. 2a) shows time series of two simulated pixels in terms of a normalized shaper outputs 101, 103 in arbitrary units over time. FIG. 2b) shows the corresponding pulse detection triggers. The dotted rectangle 105 shows an event that was coincident in two neighboring pixels. The lower graph in FIG. 2c) shows that the event 111 was indeed caught by the coincidence detection and it will, according to some embodiments of the present invention, consequently disable the counting mechanism for that particular event.

Figure 2:
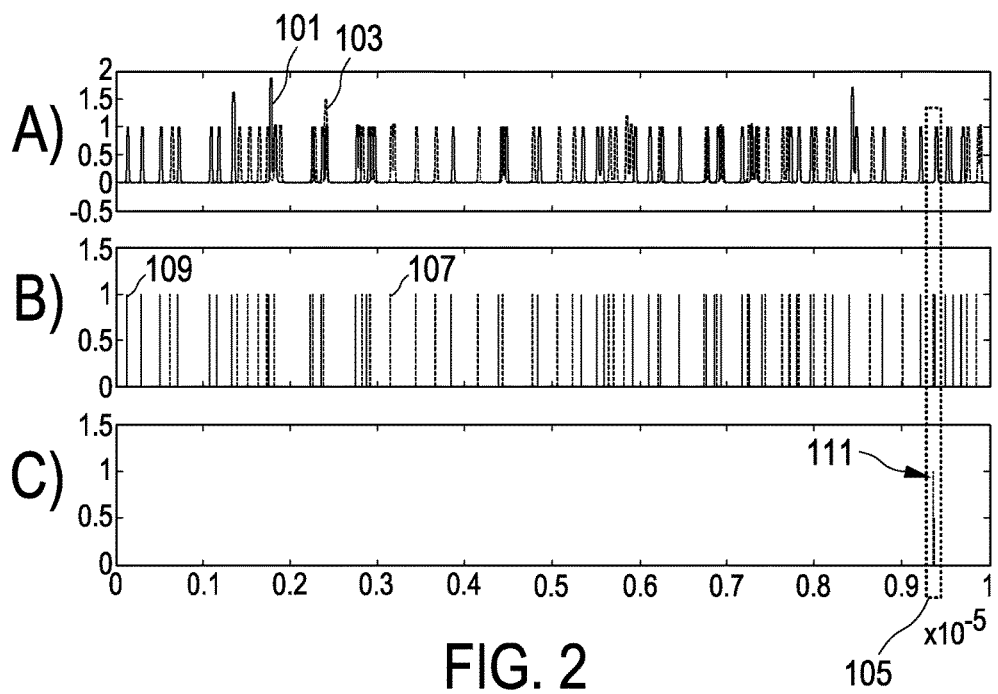
FIG. 2 shows time series of two simulated pixels.
Figure 3:
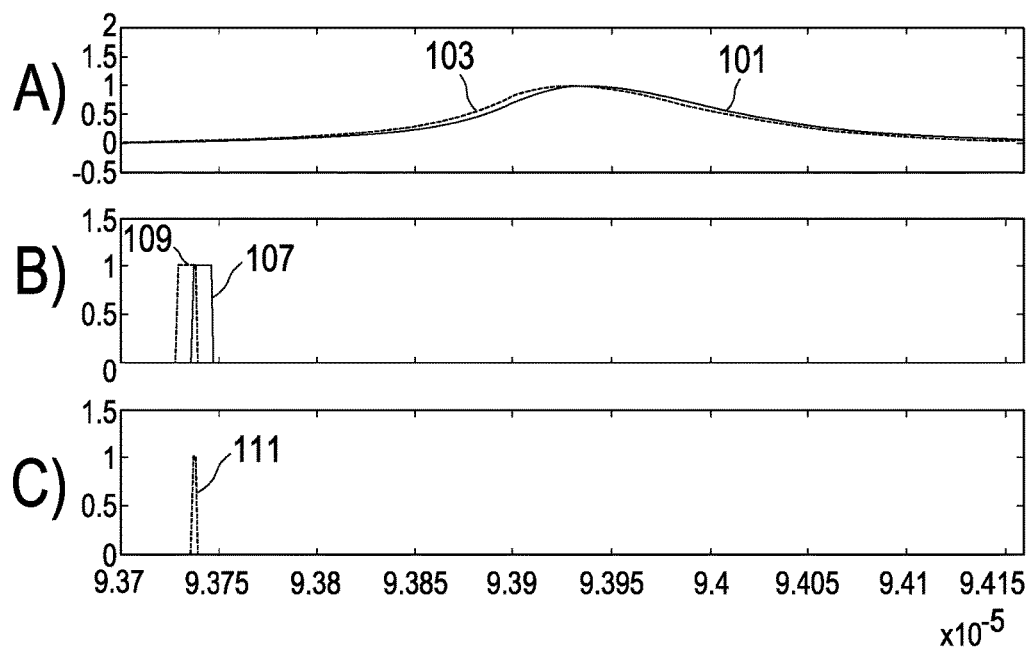
FIG. 3 shows a zoom of an area marked in FIG. 2.

FIG. 3 shows a zoom of the area marked by the rectangle 105 in FIG. 2. The overlap (111) of the Pulse Detection signals 107, 109 (FIG. 3b) is indicative of the near-simultaneous occurrence of both events.

It is noted here that, as the simulation was made to show the functionality of the detection, events are mono-energetic and no differentiation of regular events and charge-sharing events was made.

Figure 4:
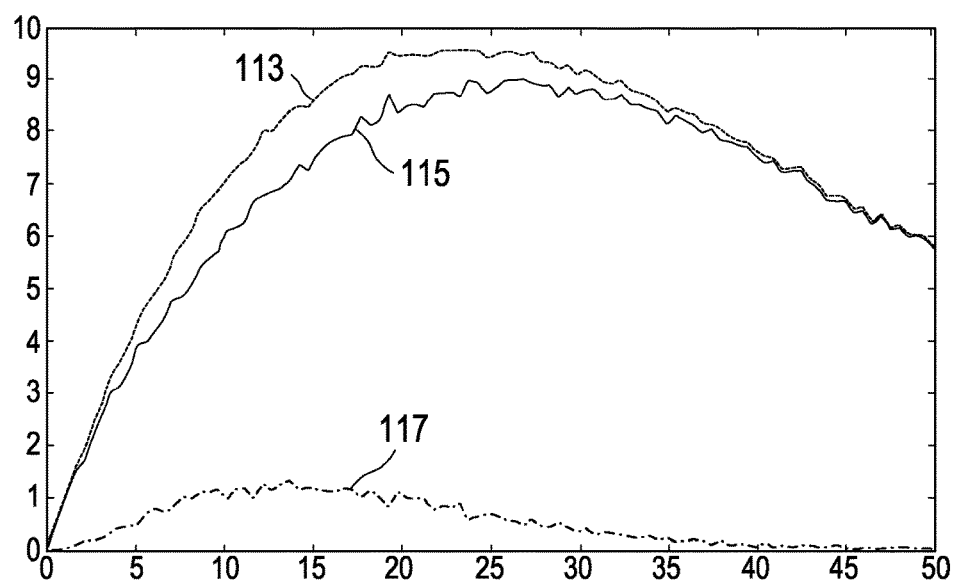
FIG. 4 shows a comparison of count-rate figures with and without the use of the prevention circuitry of the present invention.

FIG. 4 shows a comparison of count-rate figures with and without the use of the prevention circuitry of the present invention in terms of observed count rate (Mcps/pixel) over impinging count rate (ICR, Mcps/pixel).

Due to high rates of events it is to be expected that some true events are also rejected, even though such true events do not correspond to a charge sharing event but rather take place by near simultaneous impact of two separate photons. The main impact of such undesired rejection is a loss of count-rate. FIG. 4 shows count-rate figures of a pixel with (line 113) and without (115) charge sharing rejection. As expected the registered count-rate in case of preventing the counting of charge sharing events is somewhat lower. As the rate increases the probability of falsely rejecting truly separate events increases. Beyond the maximum rate, extreme pile up makes the pulse detection more difficult and the count-rate curve therefore asymptotically follows the paralyzable model. In moderate rates (e.g. 0-10 Mcps/pixel ICR), the impact of the rejection circuit is minimal and a significant improvement of the spectrum quality may be expected by having sorted out events which were caused by charge sharing. FIG. 4 already accounts for the coincidence of four adjacent pixels onto a denominated centre pixel.

Figure 5:
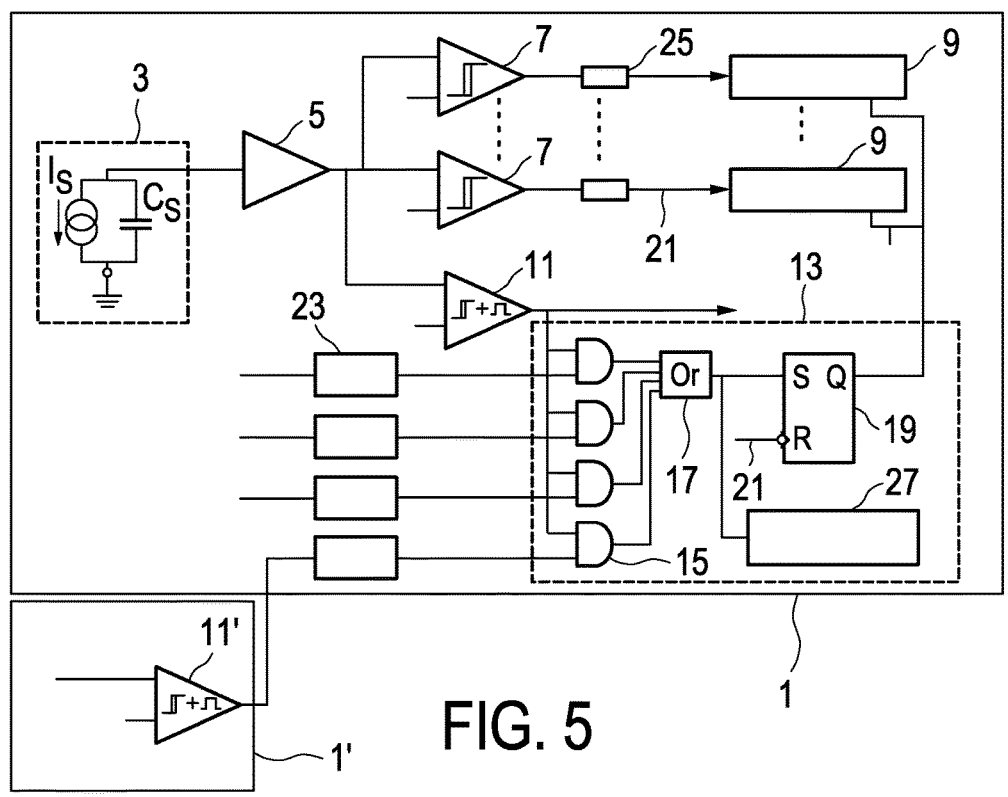
FIG. 5 shows a block diagram illustrating a modification of the photon counting device shown in FIG. 1.

FIG. 5 shows a block diagram illustrating a modification of the photon counting device shown in FIG. 1.

In this modification, it is provided to register the number of events that have been rejected for every given pixel (curve 117 in FIG. 4). Such a count value can be easily attained by extending the embodiment shown in FIG. 1 to also include an additional counter 27 as shown in FIG. 5. In this embodiment a charge sharing events will be counted in two or more pixels, i.e. each pixel in coincidence will register the event. If required, measures can be taken to register the charge shared event in one pixel. The pixels involved in the event can be resolved from the active states of the AND function 15.

The structure of the photon counting device shown in FIG. 5 corresponds to that shown in FIG. 1, except for the addition of the counter 27 counting the instances where two pulses where found to be present in a coincidence window.

Figure 6:
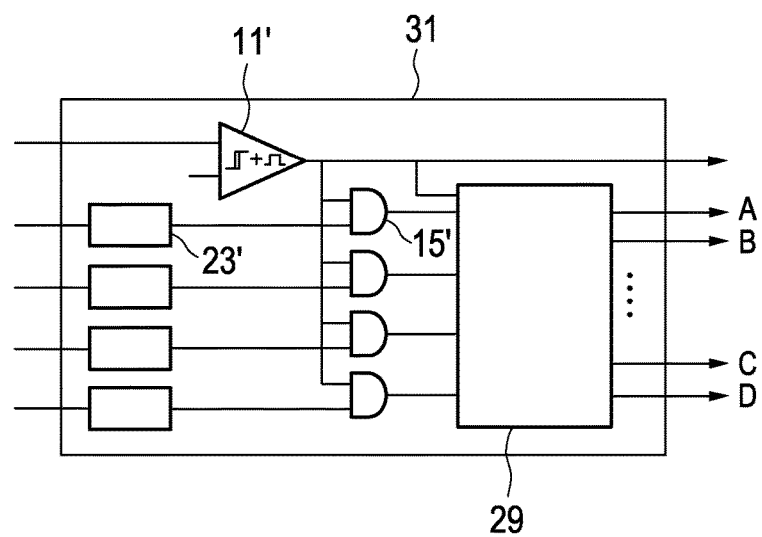
FIG. 6 shows a portion of a prevention circuitry in accordance with another embodiment of the invention.

FIG. 6 shows a portion 31 of a prevention circuitry in accordance with another embodiment of the invention.

The embodiment addresses a possible implementation to restore a charge sharing event in the analogue domain.

Similar to the embodiments shown in FIGS. 1 and 4, a pulse detector 11' is provided, the output of which is logically compared (AND functions 15') with neighboring logic signals delayed by windows delays 23'.

Deviating from the embodiments shown in FIGS. 1 and 4, the OR function and the RS flip-flop are replaced by an arbitration control section 29. The purpose of this arbitration control section is to decide which pixel is to receive the full collected charge, i.e. it detects which pixels were in coincidence and selects the direction of the charge sum. This selection can be done in very simple terms, e.g. having a predefined weight where charge is always transferred from South-to-North and East-to-West.

Outputs of the arbitration control section include signals A, B, C and D (explained below).

This embodiment exploits the fact that the coincidence window and decision can be made very quickly (e.g. within 1-2 ns). Such a quick reaction to an incoming pulse allows selecting the shaper to be added before the transient response reached the lowest threshold.

Figure 7:
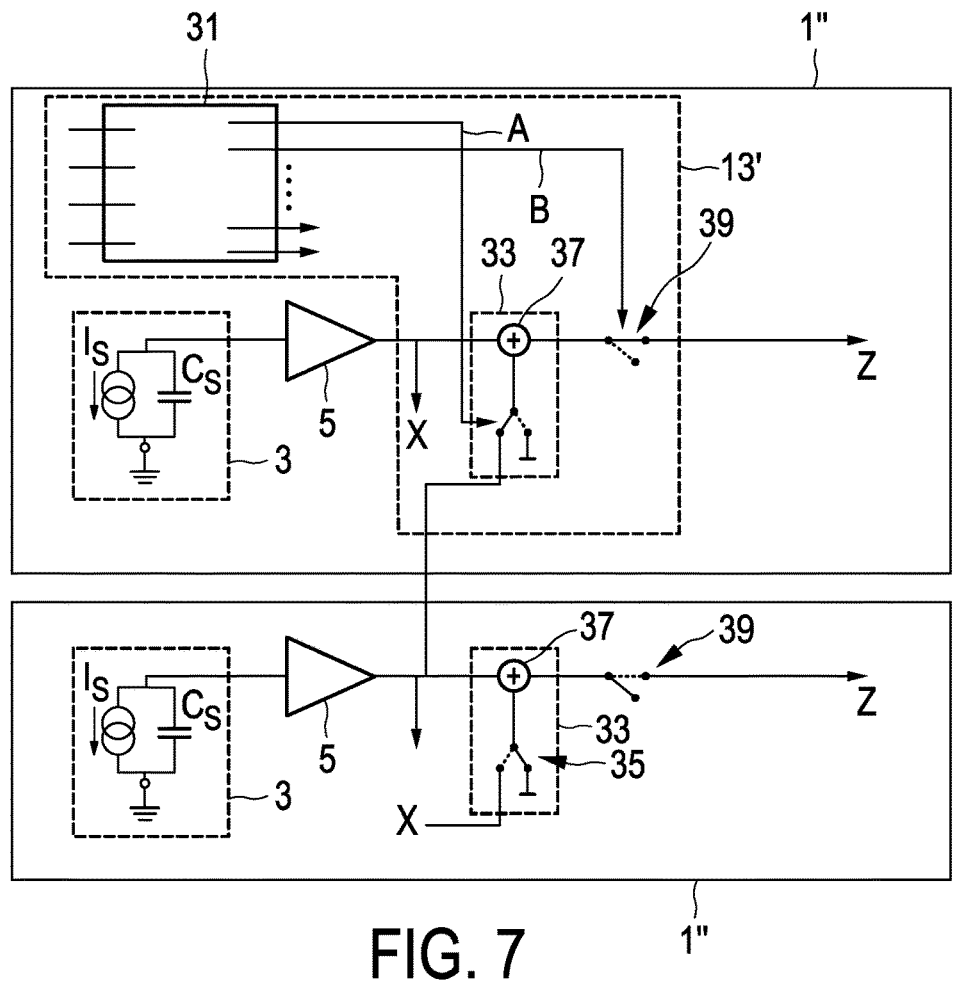
FIG. 7 shows two neighboring photon counting devices including the portion of the prevention circuitry shown in FIG. 6.

FIG. 7 shows two neighboring photon counting devices including the portion 31 of the prevention circuitry 13' shown in FIG. 6. For sake of simplicity, here only two of the neighboring photon counting devices 1" are (partially) shown.

The photon counting device 1" includes, similar to that shown in FIG. 1 or 4, a direct converter 3 and a pulse shaper 5. The output of the pulse shaper 5 is coupled to an adding section 33 and also provided to neighboring photon counting devices 1" (signal X).

The adding section 33 is here further coupled to the output of the pulse shaper 5 of the neighboring photon counting device 1".

The signal A provided by the arbitration control section 29 (see FIG. 6) controls a switch 35, which connects or disconnects the output of the neighboring shaper 5 to an adder 37 of the adding section 33.

The output (signal Z) of the adding section 33 is directed to the discriminators (not shown) of the photon counting device 1". Between the discriminators and the adding section 33 a further switch 39 is provided, which is controlled by signal B from the arbitration control section 29.

Assume that the arbitration control section 29 determines that the pulses received by the shaper 5 of the two photon counting devices 1" shown in FIG. 7 are due to a charge sharing event and therefore should be counted by the upper counting device 1". Signal A is provided to connect the adder 37 not only with the shaper 5 of the upper counting device 1" but also with the shaper 5 of the lower counting device 1". Further, signal B is provided to the switch 39 such that the output of the adding section 33 indeed reaches the discriminators.

Correspondingly, the adding section 33 and the switch 39 of the lower photon counting device 1" are controlled by the corresponding arbitration control section (not shown) to stop propagation of signals to the discriminators (and therefore also to the corresponding counters (not shown)).

The further signals C, D are used for controlling corresponding circuitry with respect to other neighboring photon counting devices.

Figure 8:
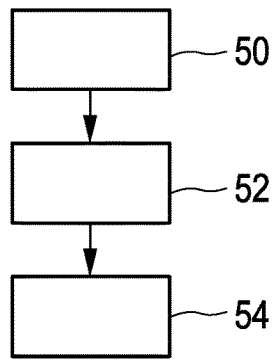
FIG. 8 shows a schematic flow diagram illustrating a method for counting photons according to an embodiment of the invention.

FIG. 8 shows a schematic flow diagram illustrating a method for counting photons according to an embodiment of the invention.

In a receiving step 50, a pulse generated by a photon interacting with a piece of converter material is received.

The received pulse is provided to a pulse detector and as soon as the pulse reaches a predetermined energy level, in a signal providing step 52, a pulse logic signal is provided.

In case a neighboring logic signal indicating an input of predetermined energy level in at least one neighboring piece of converter material and the pulse logic signal are present together in a coincidence window of predetermined size, in a prevention step 54, the pulse is prevented from being counted by any one of a plurality of counters, each of the counters being coupled to one of a plurality energy discriminators, for counting photon interactions with energy discrimination according to an energy level of the coupled energy discriminator, each energy discriminators being arranged to receive the pulse.

While the invention has been illustrated and described in detail in the drawings and foregoing description, such illustration and description are to be considered illustrative or exemplary and not restrictive; the invention is not limited to the disclosed embodiments.

Other variations to the disclosed embodiments can be understood and effected by those skilled in the art in practicing the claimed invention, from a study of the drawings, the disclosure, and the appended claims.

The above discussion to some extend relates to energy resolving photon counting detectors for spectral CT. The present invention may however also be put to use also in other detectors for a wide range of applications, e.g. photon-counting mammography.

In the claims, the word "comprising" does not exclude other elements or steps, and the indefinite article "a" or "an" does not exclude a plurality.

A single processor, device or other unit may fulfill the functions of several items recited in the claims. The mere fact that certain measures are recited in mutually different dependent claims does not indicate that a combination of these measures cannot be used to advantage.

Operations like detecting, determining an energy, providing signal, counting events or signals and preventing propagation of a signal can be implemented as program code means of a computer program and/or as dedicated hardware.

A computer program may be stored and/or distributed on a suitable medium, such as an optical storage medium or a solid-state medium, supplied together with or as part of other hardware, but may also be distributed in other forms, such as via the Internet or other wired or wireless telecommunication systems.

Any reference signs in the claims should not be construed as limiting the scope.

The invention claimed is:

1. A photon counting device for counting photon interactions in a piece of converter material, comprising:
    a plurality of energy discriminators and a pulse detector, each being arranged to receive a pulse generated by a photon interacting with the piece of converter material, and
    a plurality of counters, each of the counters being coupled to one of the energy discriminators, for counting photon interactions with energy discrimination according to an energy level of the coupled energy discriminator,
    wherein the pulse detector is arranged to provide a pulse logic signal upon receiving an input of a predetermined energy level, the predetermined energy level being lower than the energy levels of the energy discriminators,
    wherein the photon counting device further comprises a prevention circuitry arranged to receive a neighboring logic signal indicating an input of the predetermined energy level in at least one neighboring piece of converter material,
    wherein the prevention circuitry is arranged to selectively prevent a pulse from being counted by any one of the plurality of counters in case the pulse logic signal and the neighboring logic signal are present together in a coincidence window of predetermined size.

2. The photon counting device according to claim 1, wherein the prevention circuitry is provided with a digital propagation delay network for determining whether the pulse logic signal and the neighboring logic signal are present together in the coincidence window, and/or wherein the pulse logic signal is provided with a monostable characteristic.

3. The photon counting device according to claim 1, comprising an output for providing the pulse logic signal to a photon counting device for counting photon interactions in a neighboring piece of converter material.

4. The photon counting device according to claim 3, comprising a pulse window delay section for delaying the providing of the pulse logic signal by a predetermined period of time.

5. The photon counting device according to claim 1, comprising a neighbor window delay section for delaying the receiving of the neighboring logic signal by the prevention circuitry by a predetermined period of time.

6. The photon counting device according to claim 1, comprising a discriminator delay section for delaying the receiving of the pulse by the plurality of energy discriminators by a predetermined period of time and/or a plurality of counter delay sections, each provided between an output of an energy discriminator and an input of a counter and providing a delay of a predetermined period of time.

7. The photon counting device according to claim 1, wherein the prevention circuitry is further arranged to stop preventing the pulse from being counted upon receiving an end signal from an energy discriminator and/or the pulse detector, said end signal indicating that the pulse has expired.

8. The photon counting device according to claim 1, comprising a pulse counter arranged to count photon interactions based on the pulse logic signal provided by the pulse detector.

9. The photon counting device according to claim 1, comprising a coincidence counter arranged to count coincidence events of the pulse logic signal and the neighboring logic signal being present together in the coincidence window.

10. The photon counting device according to claim 9, wherein the prevention circuitry is arranged to receive separate neighboring logic signals, each of the separate neighboring logic signal indicative of an input of predetermined energy level in a different neighboring piece of converter material,
    wherein the coincidence counter is arranged to provide separate counts of coincidence events for the different neighboring pieces of converter material.

11. The photon counting device according to claim 1, comprising
    an adding section arranged for selectively adding the pulse generated by the photon interacting the piece of converter material and a pulse generated by the photon interacting with the neighboring piece of converter material, and
    an arbitration control section arranged to control the adding section based on the pulse logic signal and the neighboring logic signal.

12. The photon counting device according to claim 11, comprising a pulse output arranged for outputting the received pulse generated by the photon interacting with the piece of converter material to a photon counting device for counting photon interactions in the neighboring piece of converter material.

13. The photon counting device according to claim 11, comprising a switch arranged for preventing the plurality of energy discriminators from receiving the pulse,
    wherein the arbitration control section is arranged to control such that either the adding section adds the pulse generated by the photon interacting the piece of converter material and the pulse generated by the photon interacting with the neighboring piece of converter material or the switch prevents the plurality of energy discriminators from receiving the pulse.

14. A photon counting method for counting photon interactions in a piece of converter material, comprising the steps of:
    receiving a pulse generated by a photon interacting with the piece of converter material,
    providing a pulse logic signal upon the pulse reaching a predetermined energy level, and
    preventing, in case a neighboring logic signal indicating an input of predetermined energy level in at least one neighboring piece of converter material and the pulse logic signal are present together in a coincidence window of predetermined size, the pulse from being counted by any one of a plurality of counters, each of the counters being coupled to one of a plurality energy discriminators, for counting photon interactions with energy discrimination according to an energy level of the coupled energy discriminator, each energy discriminators being arranged to receive the pulse.

15. A non-transitory software product for counting photon interactions, the software product comprising program code means for causing a photon counting device according to claim 1 to carry out the steps of the method as claimed in claim 14 when the software product is run on the photon counting device.

* * * * *